Nov. 1, 1927.
J. A. HICKS
1,647,228
RAILWAY CAR DOOR FASTENING DEVICE
Filed June 4, 1925
8 Sheets-Sheet 1

Inventor
James A. Hicks

Nov. 1, 1927.

J. A. HICKS

1,647,228

RAILWAY CAR DOOR FASTENING DEVICE

Filed June 4, 1925

Inventor
James A. Hicks
By Cushman, Bryant & Darby
Attorneys

Nov. 1, 1927.

J. A. HICKS 1,647,228

RAILWAY CAR DOOR FASTENING DEVICE

Filed June 4, 1925  8 Sheets-Sheet 5

Inventor
James A. Hicks.
Attorneys

Nov. 1, 1927.

J. A. HICKS

1,647,228

RAILWAY CAR DOOR FASTENING DEVICE

Filed June 4, 1925

Nov. 1, 1927.  1,647,228
J. A. HICKS
RAILWAY CAR DOOR FASTENING DEVICE
Filed June 4, 1925    8 Sheets-Sheet 8

Inventor
James A. Hicks
Attorneys

Patented Nov. 1, 1927.

1,647,228

UNITED STATES PATENT OFFICE.

JAMES A. HICKS, OF ATLANTA, GEORGIA, ASSIGNOR, BY DIRECT AND MESNE ASSIGNMENTS, TO AUTOMATIC CAR LOCK COMPANY, OF ATLANTA, GEORGIA, A CORPORATION OF GEORGIA.

RAILWAY-CAR-DOOR-FASTENING DEVICE.

Application filed June 4, 1925. Serial No. 34,904.

The present invention relates to improvements in door fastenings primarily designed for securing freight car doors in closed position.

While some of the features of the improved fastening means hereinafter described are applicable to doors generally, yet as the invention is particularly designed for use with freight car doors, such use is shown in the drawings and will be hereinafter particularly described.

Great difficulty is experienced with the means commonly provided for securing the sliding doors generally used on freight cars in closed position. After a relatively short period of use, it frequently happens that the door has become so warped or bent outward at its edges that it does not make the desired close contact with the wall of the car when in closed position.

Again, the fastenings commonly employed are frequently insufficient to withstand the pressure of the loading of the car, such pressure acting to bulge the doors outward at times sufficient to entirely disengage the fastening members from the car wall.

The temporary expedients resorted to in order to overcome this latter defect, such as erecting a special wall across the door opening within the car, are expensive, frequently cause delays in transmitting freight, and damage to the walls of the car.

By the present invention I provide a very strong, simple, but effective means for securing and retaining a railway car door in closed position, the door being positively forced into close contact with the wall of the car and accidental unlocking of the door is absolutely prevented.

The present invention is adapted for securing either solid or ventilating doors in closed position, and in the embodiment of the invention illustrated is shown in connection with a combined ventilating and solid door.

My improved fastening is adapted for use with an automatic locking mechanism of the general type or class of that shown in my prior applications by which it is necessary to effect an application and release of the brakes of the car, by proper manipulation of the fluid pressure brake devices before the lock means can be released, such mechanism including a signal or alarm device and providing an effective check to unauthorized opening of car doors and stealing of the loading.

Means are also provided, whereby when desired, the automatic feature referred to may be rendered inoperative and the door readily opened at any time as may be desirable in handling certain classes of freight.

Having thus generally stated the purposes and nature of the invention, the embodiments thereof illustrated in the accompanying drawings will be more specifically described.

Referring to the drawings:—

Referring to the drawings, in which corresponding reference characters designate like parts in the several views, 1 designates the body of a freight car, which is to be understood as being provided with fluid pressure brake devices of the kind now commonly employed. The car illustrated is provided with a combination door including a solid door 2 and a ventilating door 3, which are supported from a track 4 by suitable hangers 5. A grooved guideway $4^a$ may be provided for the lower edges of the doors.

The track 4 is, as shown, preferably made in the form of an angle iron on the horizontal member of which travel the rollers of the door hangers 5. This track is secured to the car wall a suitable distance above the opening which is controlled by the door 2. The door opening in the car wall is preferably surrounded by suitable weather strips, which may be metal plates, $1^a$, $1^b$, $1^c$ and $1^d$. Similar additional strips are preferably provided adjacent the vertical edges of said door opening, being spaced slightly from the strips $1^b$, $1^d$, to provide conduits or channels $1^e$, which will serve to conduct any water that may strike or collect upon the upper surface of the transverse strip $1^a$ downward and discharge the same below the car door.

In the face of the upper transverse weather strip $1^a$ is formed a recess adapted to receive a portion of a roller $2^a$, mounted in a casing, secured to the upper edge of the door 2, when the door is in its closed position. To insure entry of the roller $2^a$ into said recess when the door is forced into close contact with the several weather strips surrounding the door opening by the camming action of the fastener hereinafter described, a suitable cam 200 is provided. As shown, this cam is secured to the inner face of a frame bar or plate 201, which is bolted to the car wall and extends vertically slightly above the outer edge of the track member 4.

When the door is released from the camming action of the fastener hereinafter referred to, it may be readily moved to carry the roller $2^a$ from the aforesaid recess, and as said roller rides on the vertical face of the upper horizontal weather strip $1^a$, it positively maintains the door from contact with the adjacent car wall during the sliding operation.

Figures 1, 2, 19:
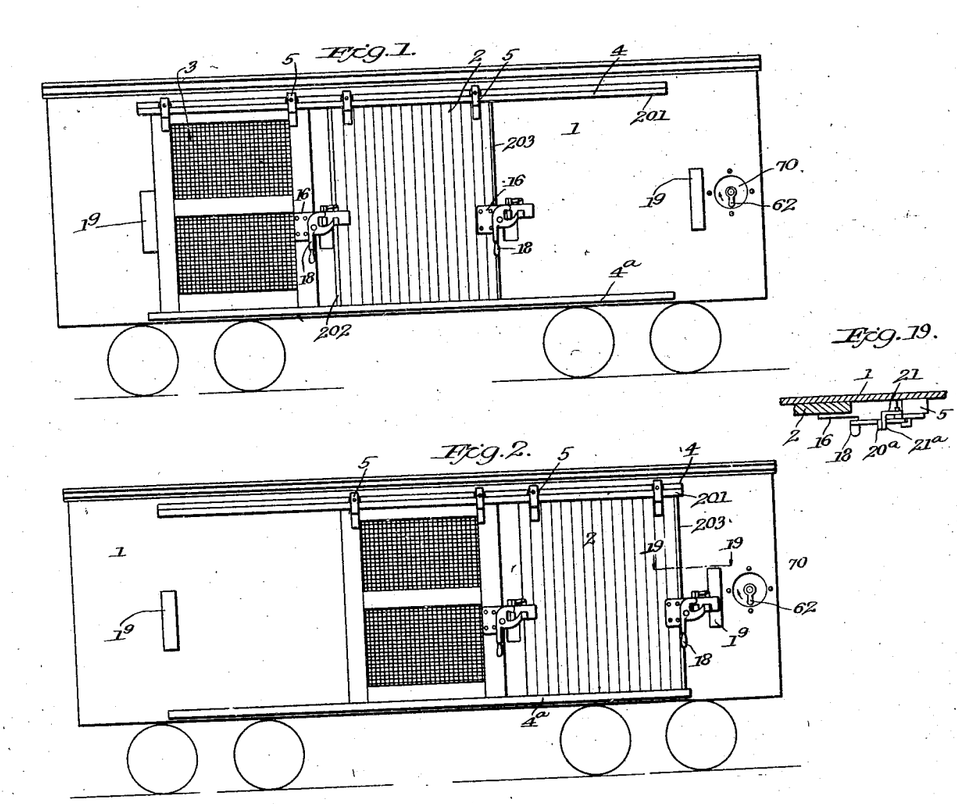
Figure 1 is a side elevation of a railway freight car having embodiments of my present invention applied thereto, the solid door being shown in position across the opening in the car wall.
Figure 2 is a similar view showing the ventilating door in operative position.
Figure 19 is a detail substantially on the line 19—19 of Figure 2.
Figure 3:
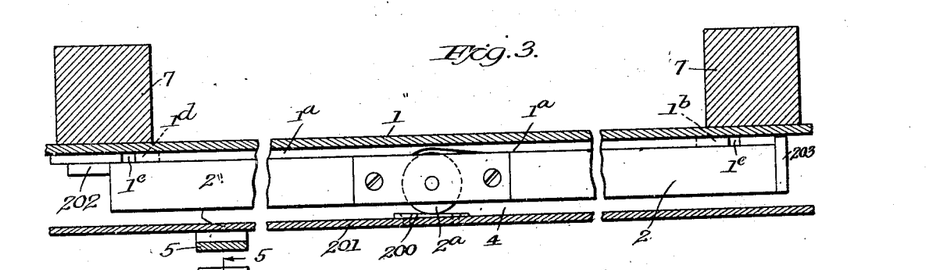
Figure 3 is a horizontal section, substantially on the line 3—3 of Figure 5, above the solid door on an enlarged scale.
Figure 4:
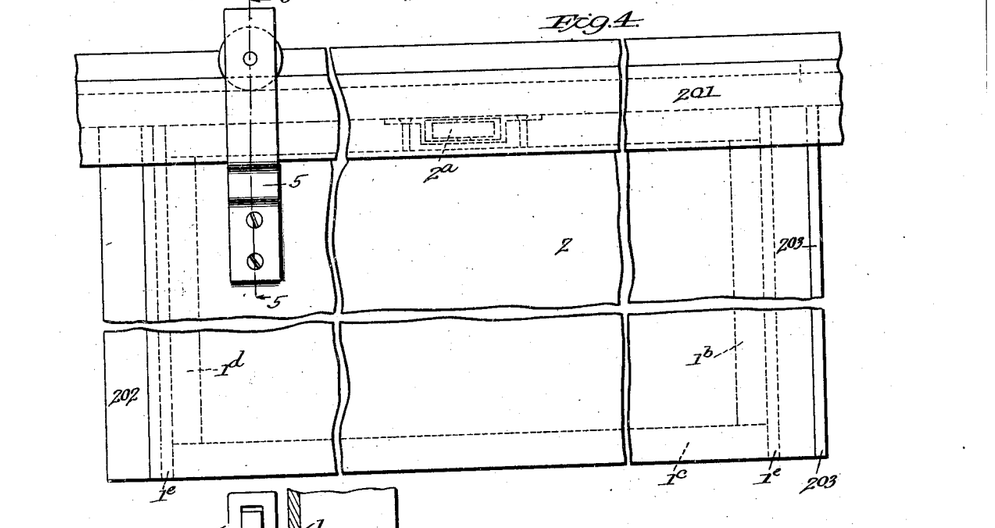
Figure 4 is an elevation of parts shown in Figure 3.
Figure 5:
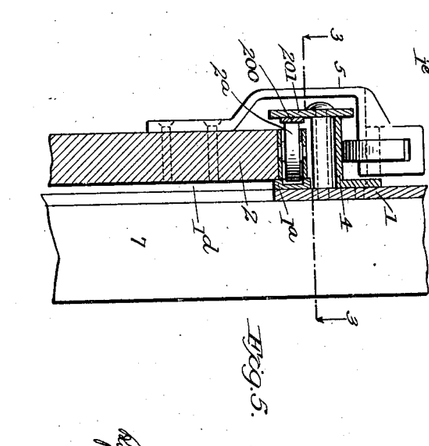
Figure 5 is a vertical section substantially on the line 5—5 of Figure 4.

As shown, a batten or vertical strip 202 is provided for checking movement of the solid door 2 to the left in Figure 1, and the right hand edge of the door is provided with a strip 203, which projects beyond the inner face of the door proper in position to abut the edge of the outer right hand vertical weather strip before referred to.

The car wall may also be provided with stop blocks $1^s$ to limit movement of both doors 2, 3, toward the ends of the car.

A suitable latch mechanism casting is supported as by bolts 6, to one face of a door post 7, or by any suitable means to the inner face of the side wall of the car opposite an opening formed in such wall. A latch member 8 is pivotally suspended within said casting and adapted to be swung upward so as to extend out from the wall of the car through the aforesaid opening and across the adjacent edge of the car door. As shown, the member 8 is sleeved on a rod 9, which is supported by ears 10 depending from a carriage-like block 11 that is mounted on a threaded shaft 12 supported in suitable bearings in the aforesaid casting. By means of a suitable wrench applied to the head of the shaft 12, the latch member 8 may be bodily adjusted transversely of the car to accommodate the fastening to doors of different thickness. The shaft is preferably held against longitudinal movement by a lock screw 13.

Figure 9:
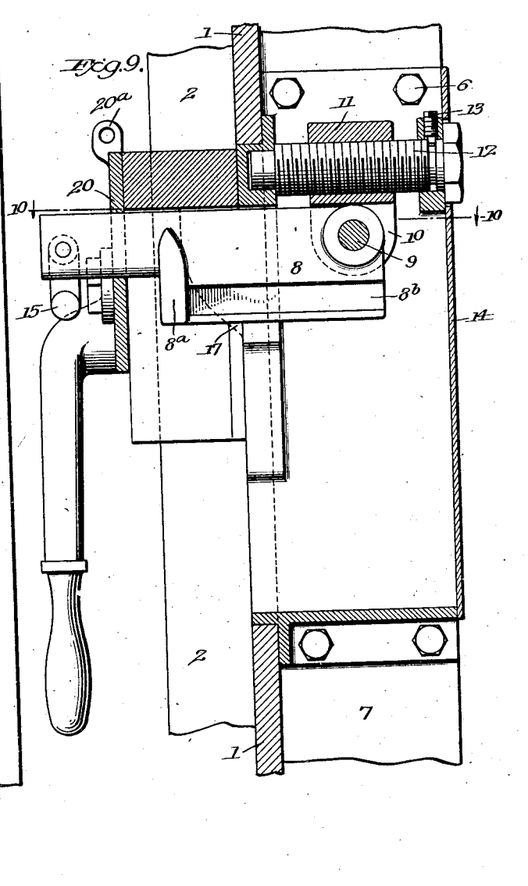
Figure 9 is a section substantially on the line 9—9 of Figure 8.
Figure 10:
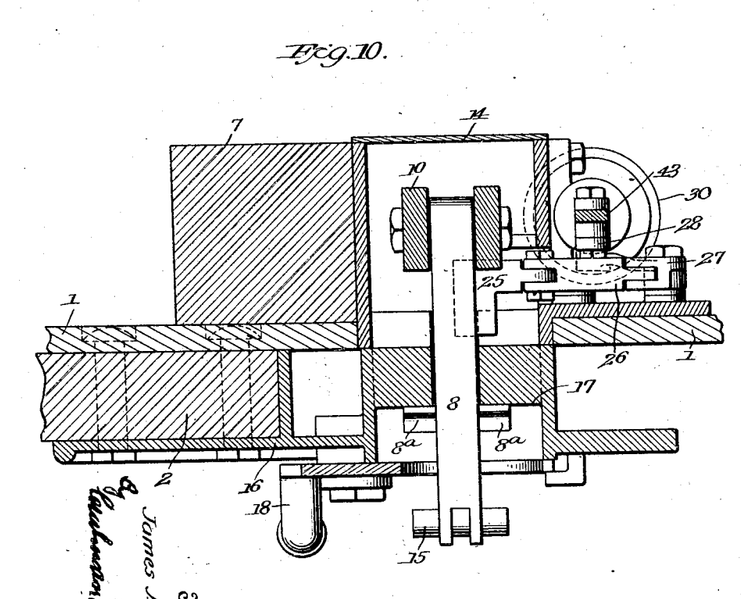
Figure 10 is a horizontal section substantially on the line 10—10 of Figure 9.

The back plate 14 of the casting which surrounds the opening in the wall of the car through which the latch member is adapted to be extended may be removably secured in place so that, if desired, it can be readily detached, but as shown in Figure 9, this is not necessary in order to adjust the support for the latch member as the enlarged head of the shaft 12 extends through an opening in the back plate, so as to be always accessible.

The latch member 8 is shown as provided at its outer end with a handle 15, the stem of which is pivotally connected between the members of the bifurcated outer end of the latch member so that it may be turned into alignment with the body of the latch member or allowed to drop to the inactive position shown.

When the latch member is released and allowed to fall, it will be completely within the pocket formed in the car body by the aforesaid casting so that there will be no projecting portion to interfere with free sliding movement of the door.

Means are provided whereby the effect of swinging the latch member from its inactive, substantially vertical, position within said pocket to its extended position, will act to positively force the car door against the side of the car, and means are provided for retaining the latching member in its extended position and maintaining the desired close contact between the wall of the door and the car, which is very desirable.

As shown, the latch member is provided at each side with a laterally extending lug 8$^a$, which are adapted to cooperate with cam surfaces 17 formed on the face of a lateral extension of a plate 16, which is secured to the outer face of the car door, and projects beyond the edge thereof. The cam surfaces 17 are arranged at opposite sides of a slot in which the latch member 8 is positioned when in its extended position, and, as stated, the contact between the lugs 8$^a$ on the latch member and said cam surfaces 17 acts to positively force the door against the face of the car wall.

Figure 6:
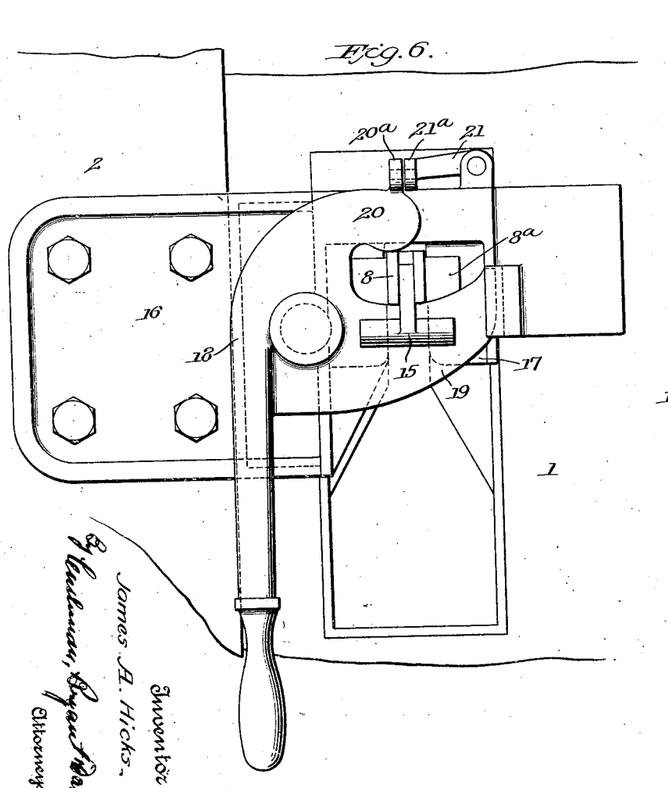
Figure 6 is an enlarged view of the improved door fastening.

A lever 18 is fulcrumed on the plate 16 and provided with spaced arms 19, 20, adapted to engage the lower and upper edges of the latch member 8, and retain it in its extended position. The form of the arms 19, 20, is such, and they are so related, that a movement of the lever 18 toward the position shown in Figure 6 acts to exert a camming effect on the latch member positively forcing the same upward into its fully extended position, and when in this, completely operative, position, the member 20 overlies the upper edge of the latch member and engages the same so that considerable force is required to move the lower end of lever 18 to the left in Figure 6 to disengaging position. During such disengaging movement of the lever 18, the arm 20 thereof exerts a downward push on the latch member 8, tending to break the lock between the lugs 8$^a$ and cams 17.

The arm 20 of the lever 18 is provided with a projecting lug 20$^a$, having therein a suitable aperture, and a dog 21 pivotally mounted on the plate attached to the car door is provided with a similarly apertured projection 21$^a$. When the lock is operative and the parts are positioned as shown in Figures 1 to 7, a car seal of ordinary character may be secured in the aligned passages of the lugs 20$^a$, 21$^a$. Such a seal is not required when the automatic lock hereinafter described is employed, but in case this is rendered inoperative, as is advisable under certain conditions, it is desirable to employ such a seal.

Preferably with a double door of the type shown in Figures 1 and 2, there will be provided two plates 16 and levers 18, and the cooperating latch members on the car will also be duplicated. This arrangement permits of insuring very close contact between both vertical edges of the solid portion of the door and the car wall and positively prevents outward bulging of the door, due to improper loading of the car. By reason of the weather strips between the edges of the door and the face of the car wall, it is possible to provide an absolutely water-tight joint about the opening in the car wall, which it has been very difficult to do with the type of fastenings heretofore commonly employed.

It will be seen that in case any water should gain access between the batten 202 and the weather strip or between the edge strip 203 of the door and the weather strip it could not reach the interior of the car through the door opening because of the close contact between the door and the vertical weather strips 1$^b$, 1$^d$, and would be conducted away by the conduits 1$^e$.

While it is preferred, and I have hereinbefore described the use of the improved fastener with a car having metal weather strips arranged about the door opening therein, it will be seen that the camming action of the fastener alone will effect a very close closure between the door and car wall, and if sheets of paper, for example, are interposed between the door and the wall of the door opening a very much more secure and waterproof closure will be effected than is possible with the fastening means now commonly in use.

With the improved fastening, when the combined car door is shifted to the position shown in Fig. 2, only one of the latch members on the car is employed, the other at this time lying in a substantially vertical position within the pocket formed therefor and completely behind the frame of the door.

In addition to the lock means provided by the lever 18 for retaining the latch member in its extended position, the present invention contemplates the use of an automatic lock under the control of the fluid pressure brake devices of the car. The particular form of this automatic lock herein illustrated, and which will be more particularly described hereinafter, is of the type of that of my earlier application, Serial No. 687,988, which can only be operated following an application and release of the car brakes, and which includes means for giving an audible signal whenever the manually actuatable element controlling said lock is operated, so that unlawful actuation of said release is prevented.

As shown, the latch member 8 is provided along one face, adjacent its lower edge with a groove 8$^b$, and with this groove is adapted to co-operate a dog 25 pivotally mounted on the inner face of the car wall 1, or on a plate secured thereto. A link 26 connects the dog 25 with one arm of a bell crank lever 27, the other arm of which is connected by a link 28 to the upper end of a piston rod or stem.

A piston 29 is arranged within a suitable cylinder 30 having an elongated upward extension through which the piston rod or stem extends. Preferably, this rod comprises an upper section 31, to which the link 28 is attached and a lower section 32 that is directly connected with the piston head 29, but disconnected from the upper piston section 31.

Figure 7:
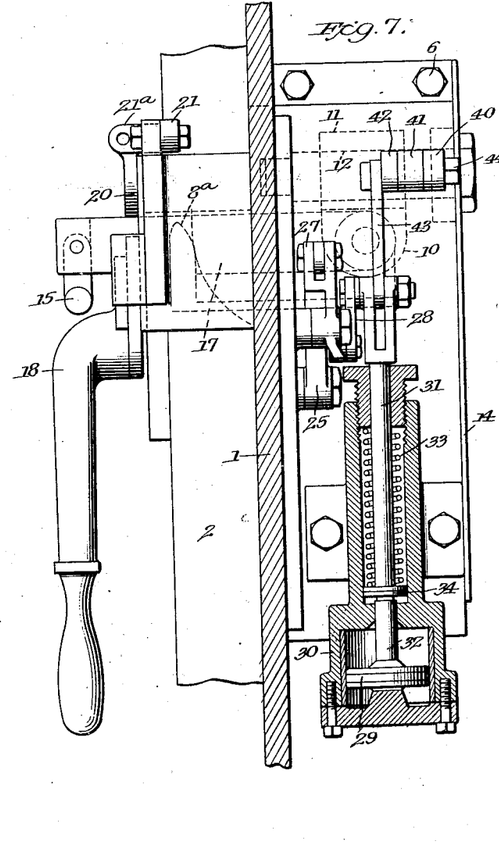
Figure 7 is a sectional view substantially on the line 7—7 of Figure 8.
Figure 8:
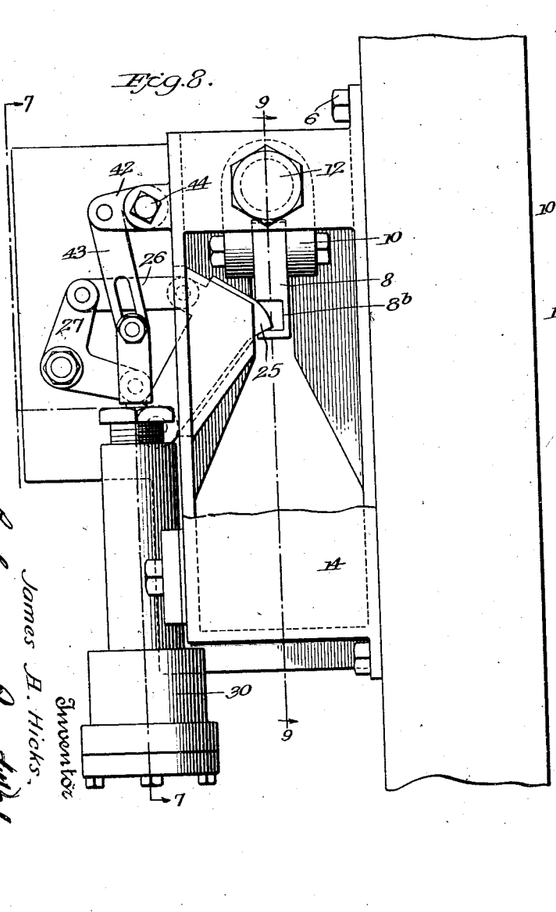
Figure 8 is an elevation of the parts of the fastening viewed from the inside of the car.

When the automatic lock is effective a coiled spring 33 surrounding the section 31 of the piston stem and cooperating with an abutment 34 thereon and an adjustable closure at the outer end of the cylinder acts to hold the parts in the relation shown in Figure 7 in which the abutment 34 contacts with the upper end of the section 32 of the piston rod. Under such conditions, whenever pressure is admitted to the cylinder 30 below the piston 29 therein, the piston will be elevated against the action of the spring 33 and through the connections between the piston rod and the dog 25 the latter will be rocked away from the fastening or latch member 8. During the time that the dog 25 is out of engagement with the latch member 8, the latter may be swung downward, by manipulation of the lock lever handle 18, and the door unfastened.

It will be seen that with the automatic lock in effective position, movement of the manually adjustable lock member 18 will be prevented, and under such conditions it is necessary to both remove the dog 25 from the path of the latch member 8 and manipulate the handle 18 to unfasten the door.

While I prefer to employ both the manually adjustable locking means and the automatic means for retaining the latch member in extended position, this is of greatest importance in the fastening of the doors of cars employed in through shipments, or where a car is to travel relatively long distances and is liable to be tampered with at the various stops en route.

In the use of the invention with cars employed for handling local freights or short shipments, or where the cars are loaded with commodities which are not likely to be pilfered, the manually adjustable lock alone is entirely sufficient. Therefore, means are provided by which the automatic lock may, when desired, be rendered ineffective. The means illustrated for this purpose comprise a shaft which is shown as mounted in an ear 40 projecting from the casting providing the pocket for the fastening member 8. On the shaft is mounted a hub 41 having a laterally projecting arm 42. This arm 42 is pivotally connected to one end of a link 43, the other end of which is pivotally connected with the bifurcated head at the upper end of the section 31 of the aforesaid piston rod. The exposed end of the shaft supporting the arm 42 is provided with a head 44 adapted to be engaged by a suitable wrench or other implement, and when so engaged the shaft may be rocked to adjust the upper section of the piston rod and the parts connecting it with said shaft and with the locking dog 25 into the relative positions shown in Figure 11. It will be seen that this movement of the parts carries the pivotal connection between the arm 42 and link 43 slightly rearward of a line connecting the axes of the shaft supporting said arm and the connection between the link 43 and piston rod forming in effect a toggle lock which retains the pivots past dead center and the parts in the relation shown in Figure 11. This adjustment removes the dog 25 from engagement with the fastening or latch member 8 and raises the upper section 31 of the piston so that it is not affected by upward movement of the piston and lower section 32 of the rod when fluid pressure is admitted to the cylinder 30 during actuation of the fluid pressure brake devices.

Under such conditions the manually adjustable lock lever 18 is the only means provided for securing the latch member 8 in its extended position and maintaining the car door closed.

As hereinbefore stated, the cylinder 30 is connected with the fluid pressure brake devices of the car so that the lock dog 25 will only be released following an application and release of the car brakes.

Various forms of valve devices controlling the actuation of said automatic lock, without interfering with the normal operation of the fluid pressure brakes and control thereof may be provided. I prefer to employ a valve mechanism for this purpose which is of the type shown in my aforesaid earlier application, in which the actuation of the piston 29 is effected by the combined action of brake pipe pressure and the exhaust from the triple valve of the ordinary fluid pressure brake devices.

These control devices are particularly illustrated in Figures 12 to 18 inclusive.

Figure 12:
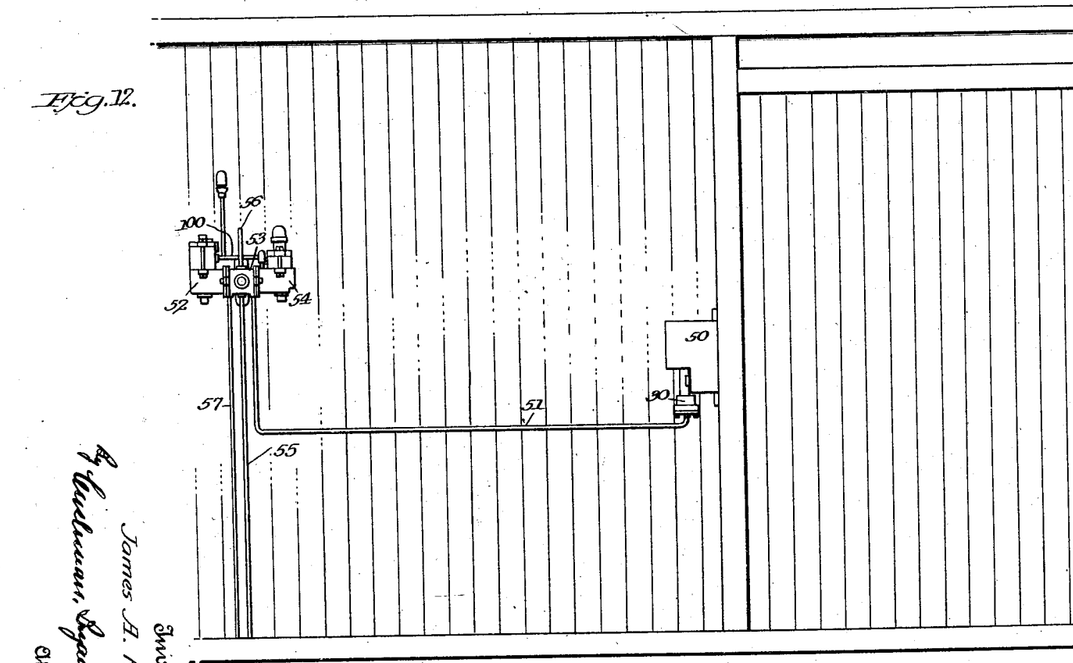
Figure 12 is a more or less diagrammatic view of the inside of the car showing the relation of the door fastener and control valve of my automatic lock to the pipes of the fluid pressure brake devices of the car.
Figure 13:
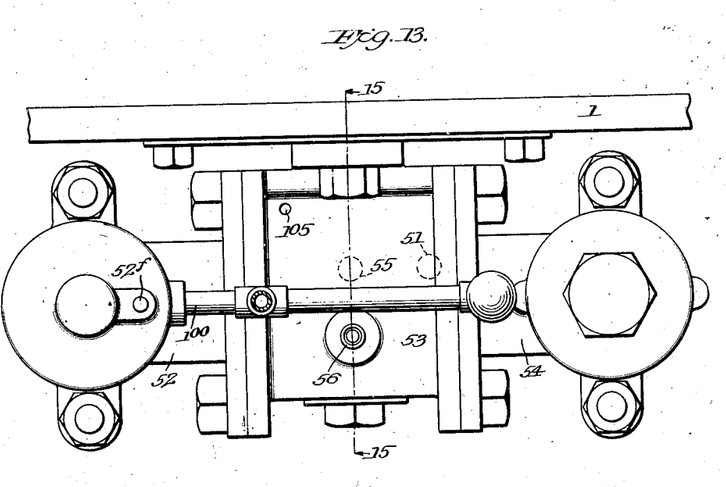
Figure 13 is a detail plan of the control valve of the automatic lock means.

Figure 12 shows that the parts of the fastening, with the exception of the body of control cylinder 30, are all enclosed within a suitable housing 50. A conduit 51 connects the cylinder 30 with a port in the main control valve casing which is shown as being secured to the wall 1 of the car body, and as including three sections 52, 53 and 54.

A pipe 55 leads from the brake pipe of the fluid pressure brake devices to a port in the section 53 of the valve casing and a pipe 56 connects another port in said casing section with the "retaining valve" which is an essential feature of the ordinary fluid pressure brake devices now in use. Another pipe 57 connects a port in the section 53 of the valve casing with the exhaust port of the triple valve of the brake devices.

The casing sections 52, 54, are each provided with two superposed chambers which are connected through suitable ports and ducts with grooves and ports formed in a bushing 60 fitted within a chamber within the central or intermediate casing section 53 and a manually adjustable turning plug 61 is arranged within said bushing and adapted to be manipulated to effect the desired application of pressure from the fluid pressure brake devices to the lock control valve 30, as will be more particularly described hereinafter.

As shown, the tapered plug valve 61 extends through an opening 70 formed in the car wall 1 and is provided at its outer end with a handle 62, by means of which said plug may be turned.

The plug valve 61 is pressed to its seat by the action of a coil spring 63 arranged in a pocket at the larger end of the plug and between the body thereof and an adjustable cap 64. Through the body of the plug valve 61 are formed two passages 65, 66, extending substantially at right angles to each other.

Figure 15:
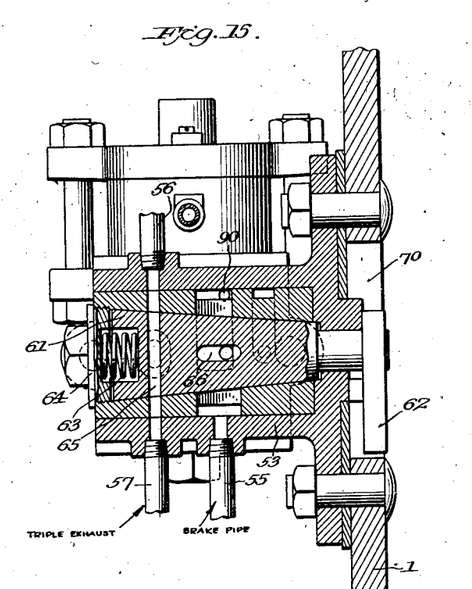
Figure 15 is a vertical transverse section substantially on the line 15—15 of Figure 13.
Figure 16:
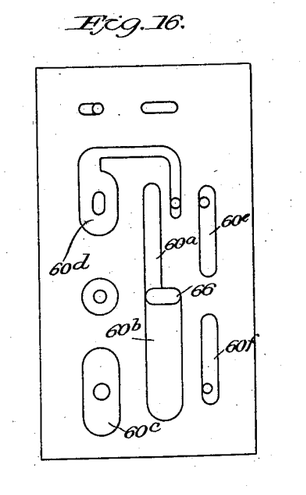
Figure 16 is a diagrammatic view of the several air passages within the casing of the valve controlling the automatic lock features of the fastening.
Figure 17:
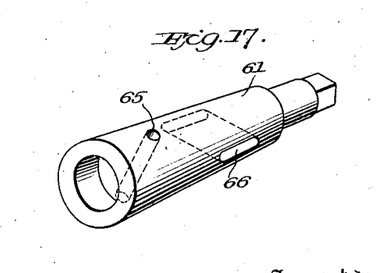
Figure 17 is a detail view of the manually adjustable plug of said valve devices.
Figure 18:
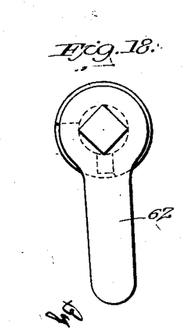
Figure 18 is a detail of the handle for actuating the plug valve shown in Figure 17.

When the parts are in normal position the plug valve 61 is in the relation shown in Figure 15, in which the passage 65 therethrough connects ports communicating respectively with the triple exhaust pipe 57 and retaining valve pipe 56. With the parts in this position the brakes of the car may be operated in the ordinary manner and without affecting the automatic lock piston 29 of the improved fastening.

When, however, it is desired to release the automatic lock of my improved door fastening mechanism the plug valve 61 is, by means of the handle 62, turned into a position substantially at right angles to that shown in Figure 15, so that the direct connection between the triple valve exhaust pipe 57 and the retaining valve supply pipe 56 is cut off and the passage 66 through the plug valve 61 comes into alignment with a port in the casing that communicates with the branch 55 of the brake pipe.

Figure 14:
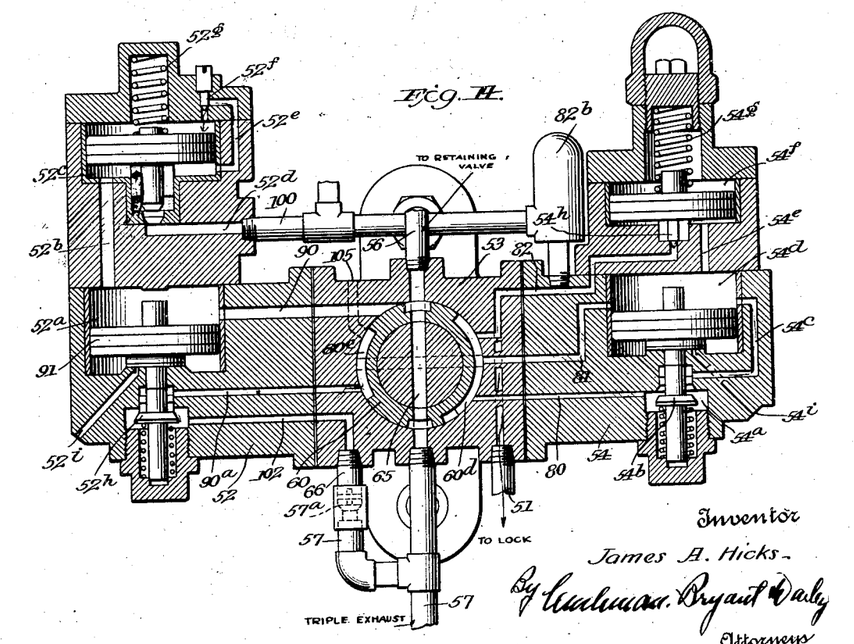
Figure 14 is a vertical sectional view through the parts shown in Figure 13 illustrating the several passages through which the various pressures from the brake pipe devices are conducted to the cylinder of the fastener.

It will be understood that Figures 14 and 15 of the drawing are more or less diagrammatic, and that the section of Figure 14 is actually a section taken on several different transverse planes.

When the plug valve 61 is turned from the position shown in Figures 14 and 15 to a position substantially at right angles thereto, in which the passage 66 communicates with the brake pipe branch 55, brake pipe pressure will pass through the passage 66 to a recess $60^a$ in the bushing 60, and from this recess through a conduit 80 into a chamber $54^a$, beneath a valve $54^b$ in said chamber which is held closed by a spring.

At the same time brake pipe pressure passes through a recess $60^b$ in the bushing 60 and a conduit 90 to a chamber $52^a$ above a piston 91 therein. The pressure thus admitted to the chamber $52^a$ also passes through a duct $52^b$ to a chamber $52^c$ beneath a piston therein. To this piston is connected a valve controlling a port $52^d$, with which communicates, in the embodiment of the invention illustrated, a whistle conduit or pipe 100.

As the brake pipe pressure thus admitted to the chamber $52^c$ lifts the piston therein, such pressure is permitted to flow through the conduit $52^d$ to the whistle sounding the same. The escape or exhaust of pressure through the whistle necessarily produces an application of the car brakes.

The chamber $52^c$ also communicates with a by-pass $52^e$ leading to the upper side of a piston in said chamber and the flow of pressure through this by-pass is controlled by an adjustable valve $52^f$. The whistle will be sounded and the brakes applied during the interval of time which is required for the pressure passing the valve $52^f$ and the coil spring $52^g$, on the upper side of the piston in said chamber, to overcome the pressure beneath said piston which results in forcing the piston down and closing the valve leading to the whistle.

This period can be accurately predetermined by adjusting the valve $52^f$.

As the brakes are applied from the reduction of pressure in the brake pipe due to the exhaust through the whistle just described, the pressure from the triple exhaust valve of the brake devices will pass through a port and passage 102 past a valve $52^h$ (that has been moved from its seat by the action of brake pipe pressure on the upper face of the piston 91) through a duct $90^a$ to a recess $60^c$ in the bushing 60. The recess $60^c$ has a port which is at this time in communication with the passage 66 through the plug valve 61 and the triple exhaust pressure passes therethrough to a recess $60^d$ in the bushing which communicates with a duct 81 that leads to the chamber $54^d$, moving the piston in said chamber down, unseating valve $54^b$ and permitting the brake pipe pressure which is standing below said valve to flow through a duct $54^c$, to chamber $54^d$, and through duct $54^e$ against the lower surface of a piston in chamber $54^f$ from which depends a valve $54^h$.

The valve $54^h$ controls a duct 82 that communicates with the pipe 51 leading, as previously described, to the cylinder 30 of the automatic lock means for the fastener.

The duct 82 is also connected through a short branch with the whistle conduit 100, a suitable regulator which may be generally similar to the piston in chamber $52^c$ and spring $52^g$ being included in said connection. Such second regulator is conventionally illustrated at $82^b$.

By this arrangement of parts it will be seen that the alarm will be sounded as long as pressure is being supplied to the lock cylinder 30 from the duct 82. When, owing to a reduction of brake pipe pressure through the whistle the brake pipe pressure falls below that required to actuate the lock the spring in the regulator 82$^b$ will close the valve cutting out the whistle. The latter will be sounded intermittently whenever the brake pipe pressure is operating the lock.

A spring 54$^g$, the pressure of which may be varied, bearing on the top of the piston in chamber 54$^f$ serves to control the action of the valve 54$^h$. When the pressure beneath the piston in chamber 54$^f$ is sufficient to overcome the pressure of the spring 54$^g$ the piston 29 of the automatic lock device will be raised.

A non-return check valve 57$^a$ is provided in the connection between the triple exhaust pipe 57 and the port or duct 102 to prevent any back flow of brake pipe pressure or triple exhaust pressure to the brake cylinder on the car.

With the construction described the only function performed by the triple exhaust pressure is to unseat valve 54$^b$ so that only a relatively light pressure is required, a pressure of approximately five pounds in the brake cylinder being sufficient.

The chambers 52$^a$ and 54$^d$ are, respectively, provided with ports 52$^i$ and 54$^i$ leading from beneath the pistons in said chambers to the atmosphere so that there is no possibility of creating a vacuum in said chambers.

When the plug valve is turned back to normal position pressure within the chambers 52$^a$, 54$^a$ escapes through an exhaust port 105 which through recesses 60$^e$ and 60$^f$ in the bushing 60 and the passage 66 in the plug valve 61 connect ports leading from said chambers with said exhaust port 105.

It is believed that the operation and advantages of the invention will be readily appreciated from the foregoing description and the drawings.

It will be seen that the invention provides a simple and very durable door fastening, comprising a minimum number of parts, by which the car door may be held in close contact with the car and one which cannot, when the automatic lock element is in service, be manipulated to open the door without giving warning to the train crew.

To release the door from its fastening, assuming that the automatic lock devices are in service, it is necessary to first turn the plug valve 61 by its handle 62. Suitable stops are provided within the opening 70 in the car wall to limit this movement of the handle to substantially a quarter turn which is sufficient to carry the passage 65 in the plug valve from a position connecting the triple exhaust with the retaining valve on the car (as shown in Figure 12) to a position where it connects the cavities 60$^c$ and 60$^d$ in the bushing 60. This movement brings the passage 66 into position to admit brake pipe pressure to the chambers 52$^a$, 52$^c$ (through the cavity 60$^b$ in bushing 60 and conduit 90). At the same time, the passage 66 admits brake pipe pressure to the cavity 60$^a$ in the bushing which communicates with the duct 80. As the brake pipe pressure is reduced and the brakes applied by the exhaust through the conduit 52$^d$ the whistle is sounded. As the spring 52$^g$ and pressure above the piston in the chamber 52$^c$ cuts off the exhaust through the whistle and the train brake pipe pressure again builds up the valve 52$^h$ will be actuated, admitting triple exhaust pressure to the chambers 54$^d$, 54$^f$, (through ducts 102, 90$^a$, cavity 60$^c$ in bushing 60, passage 65 in plug valve 61, cavity 60$^d$ in bushing 60 and conduit 81) unseating valve 54$^b$ and allowing the brake pipe pressure in duct 80 to, in due course, pass through chamber 54$^d$, passage 54$^e$, raising valve 54$^h$ and to traverse the duct 82 and pipe 51, and act to elevate the piston 29 in the lock cylinder 30, thus removing the dog 25 from engagement with the latch member 8. Then by manipulating the manually adjustable fastener lock 18 the latch member 8 will be disengaged from the door and allowed to fall into the pocket provided therefor in the side wall of the car.

Figure 11:
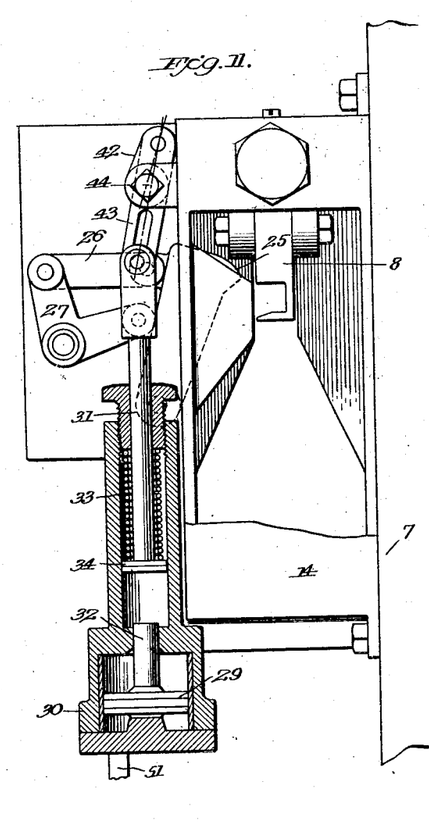
Figure 11 is an elevation of the parts within the car, partially in section, and showing the automatic lock devices in inoperative position.

In case it is not desired to employ the automatic lock, the parts may be adjusted into relations shown in Figure 11, and then the release of the fastening member 8 is controlled solely by the lever 18.

The handle 62 and plug valve 61 should be returned to normal position when the door has been thus unlocked and failure to do this will prevent the release of the automatic brake on the car, thus calling attention to the fact that the plug 61 has not been properly adjusted.

The automatic devices controlling by turning of the plug 61 hereinbefore described have been found to be more efficient and satisfactory than the form of such devices shown in my prior application before referred to. By employing pistons instead of the diaphragm valves of the earlier construction a more freely acting structure is provided, and by the present arrangement the regulation of pressure required to actuate the piston 29 of the lock cylinder 30 may be accurately controlled and varied as desired by adjustment of the spring box controlling the pressure of spring 54$^g$.

The construction of plug valve 61 and the bushing 60 cooperating therewith is very simple. The several parts and recesses in the bushing are readily provided and by machining the bushing and cylinder it is only necessary to push the bushing into place and have all of the ports properly connected without requiring an extensive drilling operation. The several sections 52, 53 and 54 of the automatic control devices may be readily secured together by means of suitable flanges, gaskets being interposed between said sections if desired.

In case it is desired to withdraw from a train a car provided with the improved fastening without unlocking it, or if the car is separated from the engine, as in a freight yard, the power necessary to effect actuation of the brake devices and release the automatic lock may be obtained by connecting to the source of fluid pressure commonly available in freight yards. Or if the car is standing on a siding where there is no supply of fluid pressure it may be connected with the engine of a train stopping at the siding.

No claim is herein made to the hand lock herein illustrated and described independent of the fluid pressure brake control means, as the same forms the subject matter of an application Serial No. 218,729, filed Sept. 10, 1927.

Having thus described the invention, what is claimed is:—

1. The combination with a railway car provided with fluid pressure brakes and having an opening in a side wall, and a door movable to and from a position to close said opening in the car wall, of a locking member connected with the car wall and adapted to extend therefrom transversely of the thickness of the door, means on the door cooperating with the locking member when the latter is in its extended position to force the door into close contact with the wall of the car, and an automatic lock for retaining the locking member in its extended position and adapted to be rendered inoperative only by an actuation of the brake devices to effect an application and release of the car brakes.

2. The combination with a railway car provided with fluid pressure brakes and having an opening in a side wall, and a door movable to and from a position to close said opening in the car wall, of a locking member connected with the car wall and adapted to extend therefrom transversely of the thickness of the door, means on the door cooperating with the locking member when the latter is in its extended position to force the door into close contact with the wall of the car, manually operable means to maintain the locking member in its extended position, and an automatic lock for retaining the locking member in its extended position and adapted to be rendered inoperative only by an actuation of the brake devices to effect an application and release of the car brakes.

3. The combination with a railway car provided with fluid pressure brakes and having an opening in a side wall, and a door movable to and from a position to close said opening in the car wall, of a locking member connected with the car wall and adapted to extend therefrom transversely of the thickness of the door, means on the door cooperating with the locking member when the latter is in its extended position to force the door into close contact with the wall of the car, means controlled by the brake actuating devices of the car for retaining the locking member in its extended position, said means normally preventing movement of said member from engagement with the door unless the brake devices are actuated to effect an application and release of the car brakes, and means for rendering said automatic lock inoperative.

4. The combination with a railway car provided with fluid pressure brakes and having an opening in a side wall, and a door movable to and from a position to close said opening in the car wall, of a locking member connected with the car wall and adapted to extend therefrom transversely of the thickness of the door, means on the door cooperating with the locking member when the latter is in its extended position to force the door into close contact with the wall of the car, manually operable means to maintain the locking member in its extended position, a supplemental automatic lock controlled by the fluid pressure brake devices of the car and adapted to normally prevent movement of the locking member from engagement with the door unless the brake devices are actuated to effect an application and release of the car brakes, and means for rendering such supplemental lock inoperative.

5. The combination with a railway car provided with fluid pressure brakes and having an opening in a side wall, and a door movable to and from a position to close said opening in the car wall, of a locking member connected with the car wall and adapted to extend therefrom transversely of the thickness of the door, means on the door cooperating with the locking member when the latter is in its extended position to force the door into close contact with the wall of the car, manually operable means on the outside of the car for maintaining the locking member in its extended position, and a supplemental automatic lock within the car and controlled by the fluid pressure brake devices of the car and adapted to prevent movement of said member from engagement with the door unless the brake devices are actuated to cause the car brakes to be applied and released.

6. The combination with a railway car provided with fluid pressure brakes and having an opening in a side wall, and a door movable to and from a position to close said opening in the car wall, of a locking member connected with the car wall and adapted to extend therefrom transversely of the thickness of the door, means on the door cooperating with the locking member when the latter is in its extended position to force the door into close contact with the wall of the car, manually operable means on the outside of the car for maintaining the locking member in its extended position, a supplemental automatic lock within the car controlled by the fluid pressure brake devices of the car and adapted to normally prevent movement of said member from engagement with the door unless the brake devices are actuated to effect an application and release of the car brakes, and means for rendering said supplemental lock inoperative.

7. The combination with a railway car provided with fluid pressure brakes and having an opening in a side wall, and a door movable to and from a position to close said opening, of means for securing the door in its closed position including a manually adjustable member accessible from the outside of the door for releasing said means, means controlled by the fluid pressure brake devices of the car for normally preventing unlocking movement of said member unless said devices are actuated to cause the brakes to be applied and released, and means for rendering said automatic lock inoperative.

8. The combination with a railway car provided with fluid pressure brakes and having an opening in a side wall, and a door movable to and from a position to close said opening, of means for securing the door in its closed position including a manually adjustable member accessible from the outside of the door for releasing said means, a lever fulcrumed on the door and adapted to be adjusted to and from a position to engage said manually adjustable member when the latter is in operative position, a supplemental lock for said member adapted to normally prevent movement thereof from operative position unless the brake devices are actuated to cause the application and release of the brakes of the car, and means for rendering said supplemental lock inoperative.

9. The combination with a railway car provided with fluid pressure brakes and having an opening in a side wall, and a door movable to and from a position to close said opening, of a manually adjustable member connected to the wall of the car and movable to a position extending transversely of the thickness of the door, a cam surface on the door cooperating with said member to hold the door against the car wall when the member is in its extended position, a manually adjustable device on the door adapted to retain said member in its extended position, and a supplemental lock controlled by the fluid pressure brake devices of the car for retaining said member in extended position.

10. The combination with a railway car provided with fluid pressure brakes and having an opening in a side wall, and a door movable to and from a position to close said opening, of a manually adjustable member connected to the wall of the car and movable to a position extending transversely of the thickness of the door, a cam surface on the door cooperating with said member to hold the door against the car wall when the member is in its extended position, a manually adjustable device on the door adapted to retain said member in its extended position, a supplemental lock controlled by the fluid pressure brake devices and acting to normally hold said member in its extended position unless the brake devices are actuated to effect an application and release of the car brakes, and means for rendering said supplemental lock inoperative.

11. The combination with a railway car provided with fluid pressure brake devices and having an opening in a side wall, and a door movable to and from a position to close said opening, of door fastening member supported within the car and movable through an opening in the wall thereof to extend transversely of the thickness of the door, means on the door cooperating with said member for forcing the door into close contact with the wall of the car when the member is in its extended position, and means controlled by the fluid pressure brake devices of the car for normally retaining said member in its extended position.

12. The combination with a railway car provided with fluid pressure brake devices and having an opening in a side wall, and a door movable to and from a position to close said opening, of door fastening member supported within the car and movable through an opening in the wall thereof to extend transversely of the thickness of the door, means for adjusting the support of said member toward and from the door, and means controlled by the fluid pressure brake devices of the car for normally retaining said member in its extended position.

13. The combination with a railway car provided with fluid pressure brake devices and having an opening in a side wall, and a door movable to and from a position to close said opening, of door fastening member connected with the car and movable through an opening in the wall thereof to extend transversely of the thickness of the door, means on the door cooperating with said member for holding the door closed when the member is in its extended position, a dog movable to and from a position where it will retain the fastening member in its extended position, and means controlled by the fluid pressure brake devices for normally retaining said dog in the path of the fastening member and withdrawing it therefrom when the brake devices are actuated to effect an application and release of the car brakes.

14. The combination with a railway car provided with fluid pressure brake devices and having an opening in a side wall, and a door movable to and from a position to close said opening, of door fastening member connected with the car and movable through an opening in the wall thereof to extend transversely of the thickness of the door, means on the door cooperating with said member for holding the door closed when the member is in its extended position, a dog movable to and from a position where it will retain the fastening member in its extended position, means controlled by the brake devices of the car for normally positioning the dog to maintain the fastening member in its extended position, said dog being automatically moved to inoperative position when the brake devices are actuated to effect an application and release of the car brakes, and means for positively moving the dog from the path of said fastening member and retaining it in inoperative position.

15. The combination with a railway car provided with fluid pressure brake devices and having an opening in a side wall, and a door movable to and from a position to close said opening, of door fastening member connected with the car and movable through an opening in the wall thereof to extend transversely of the thickness of the door, means on the door cooperating with said member for holding the door closed when the member is in its extended position, a pivotally mounted dog, adapted to normally maintain the fastening member in its extended position, a cylinder connected with the fluid pressure brake devices, a piston in said cylinder, connections between the stem of the piston and said dog whereby the latter will be moved from engagement with the fastening member when the brake devices are actuated to effect an application and release of the car brakes, and means for adjusting the dog out of the path of the fastening member and retaining it in such inoperative position without interfering with the operation of the car brake devices.

16. The combination with a railway car provided with fluid pressure brake devices and having an opening in a side wall, and a door movable to and from a position to close said opening, of door fastening member connected with the car and movable through an opening in the wall thereof to extend transversely of the thickness of the door, means on the door cooperating with said member for holding the door closed when the member is in its extended position, a pivotally mounted dog adapted to normally retain the fastening member in its extended position, a cylinder connected with the fluid pressure brake devices, a piston in said cylinder having a divided piston stem, connections between one section of the piston stem and said dog, whereby the latter will be automatically moved from the path of the fastener when the brake devices are actuated to effect an application and release of the car brakes, and means for effecting relative movement between the sections of the piston stem to adjust said dog out of the path of the fastener member and retain it in such inoperative position.

17. The combination with a railway car provided with fluid pressure brakes and having an opening in a side wall, and a door movable to and from a position to close said opening, of means for securing the door in its closed position, a manually adjustable member accessible from the outside of the door for retaining the securing means in operative position, a supplemental, automatic, lock for said securing means adapted to be released when the brake devices of the car are actuated to effect an application and release of the car brakes, and an audible signal adapted to be actuated whenever said automatic lock is released.

18. The combination with a railway car provided with fluid pressure brake devices and having an opening in a side wall, and a door movable to and from a position to close said opening, of a fastening member connected with the car and movable through an opening in the wall thereof to extend transversely of the thickness of the door, means on the door cooperating with said member for holding the door closed when the member is in its extended position, a manually adjustable lock member accessible from the exterior of the car for retaining the fastening member in its extended position, and an automatic lock within the car controlled by the fluid pressure brake devices for retaining the fastening member in its extended position and adapted to be released when the brake devices are actuated to effect an application and release of the car brakes.

19. The combination with a railway car provided with fluid pressure brake devices and having an opening in a side wall, and a door movable to and from a position to close said opening, of a fastening member connected with the car and movable through an opening in the wall thereof to extend transversely of the thickness of the door, means on the door cooperating with said member for holding the door closed when the member is in its extended position, a manually adjustable lock member for retaining the fastening member in its extended position, a supplemental, automatic, lock, controlled by the fluid pressure brake devices, for holding the fastening member in its extended position, said automatic lock being rendered temporarily inoperative when the brake devices are actuated to effect an application and release of the car brakes, and an audible signal means adapted to be operated when said automatic lock is thus rendered inoperative.

20. The combination with a railway car provided with fluid pressure brake devices and having an opening in a side wall, and a combined solid and ventilating door mounted to slide across said opening, of a fastening including a member supported by the car wall and movable to extend transversely of the thickness of the door or lie wholly within the car, means on the door cooperating with said fastening member when in its extended position to maintain the door closed, a manually adjustable lock for retaining the fastening member in its extended position, and a supplemental automatic lock controlled by the brake devices for retaining the fastening member in its extended position, whereby the fastening member cannot be rendered inoperative by movement of the manually adjustable lock alone but an actuation of the brake devices to effect an application and release of the car brakes is also required.

21. The combination with a railway car provided with fluid pressure brake devices and having an opening in a side wall, and a combined solid and ventilating door mounted to slide across said opening, of a fastening including a member supported by the car wall and movable to extend transversely of the thickness of the door, means on the door adapted to cooperate with said fastening member to maintain the door closed, and two levers mounted on the door and adapted to engage the said fastening member, to retain it in its extended position, alternately as the door is adjusted to position either the solid or ventilating sections in alignment with the opening in the car wall.

22. The combination with a railway car provided with fluid pressure brake devices and having an opening in a side wall, and a combined solid and ventilating door mounted to slide across said opening, of a fastening including a member supported by the car wall and movable to extend transversely of the thickness of the door, means on the door adapted to cooperate with said fastening member to maintain the door closed, two levers mounted on the door and adapted to engage the said fastening member, to retain it in its extended position, alternately as the door is adjusted to position either the solid or ventilating sections in alignment with the opening in the car wall, and a supplemental automatic lock controlled by the fluid pressure brake devices of the car for retaining the fastening member in its extended position in either position of the car door.

23. The combination with a railway car provided with fluid pressure brake devices and having an opening in a side wall, and a combined solid and ventilating door mounted to slide across said opening, of a fastening including a member supported by the car wall and movable to extend transversely of the thickness of the door, means on the door adapted to cooperate with said fastening member to maintain the door closed, two levers mounted on the doors and adapted to engage the said fastening member, to retain it in its extended position, alternately as the door is adjusted to position either the solid or ventilating sections in alignment with the opening in the car wall, a supplemental automatic lock controlled by the fluid pressure brake devices of the car for retaining the fastening member in its extended position in either position of the car door, and means for rendering said automatic lock inoperative.

24. The combination with a railway car provided with fluid pressure brake devices and having an opening in a side wall, and a door movable to and from a position to close said opening, of means for securing the door in its closed position including a manually adjustable member accessible from the outside of the door, means for maintaining said member in locking relation to the door including a cylinder connected with the fluid pressure brake devices and a piston, a valve mechanism in the connection between said cylinder and the fluid pressure brake devices including a plurality of cylinders and pistons therein, a manually adjustable valve adapted to be turned to successively admit brake pipe pressure to one of said cylinders and triple exhaust pressure to another of said cylinders, a valve normally preventing the passage of triple exhaust pressure to the last said cylinder adapted to be automatically released by brake pipe pressure on a piston in one of the other cylinders, and a second valve actuated by the piston subjected to triple exhaust pressure and controlling the flow of brake pipe pressure to the cylinder of the locking device.

In testimony whereof I have hereunto set my hand.

JAMES A. HICKS.